United States Patent [19]

Rossaert

[11] 3,793,554

[45] Feb. 19, 1974

[54] COLOUR TELEVISION DISPLAY APPARATUS PROVIDED WITH A CATHODE-RAY TUBE

[75] Inventor: Edgard Emile Charles Rossaert, Brussels, Belgium

[73] Assignee: U.S. Philips Corporation, New York, N.Y.

[22] Filed: Oct. 4, 1972

[21] Appl. No.: 294,912

[30] Foreign Application Priority Data

Oct. 9, 1971 Netherlands .......................... 7013889

[52] U.S. Cl. ......................... 315/27 XY, 315/27 GD

[51] Int. Cl. .................................... H01j 29/70

[58] Field of Search 315/27 TD, 27 GD, 27 R, 27 SR, 315/27 XY, 24

[56] References Cited

UNITED STATES PATENTS

| | | | |
|---|---|---|---|
| 3,714,500 | 1/1973 | Kaashoek | 315/27 GD |
| 3,622,835 | 11/1971 | Parker | 315/27 XY |
| 3,440,483 | 4/1969 | Kaashoek | 315/27 SR |
| 3,504,211 | 3/1970 | Takemoto et al. | 315/27 GD |

*Primary Examiner*—Maynard R. Wilbur
*Assistant Examiner*—J. M. Potenza
*Attorney, Agent, or Firm*—Frank R. Trifari; Henry I. Steckler

[57] ABSTRACT

Colour television display apparatus in which for correction of astigmatic deflection errors a correction current flows through the coil halves of at least one deflection coil unit, which current induces a second correction current in the other deflection coils so that two correction quadripolar fields are produced. The voltage produced by the induced current across each deflection coil half is zero and the deflection coil parts are toroidally wound on the core. The apparatus may be provided with phase-shifting networks.

8 Claims, 9 Drawing Figures

COLOUR TELEVISION DISPLAY APPARATUS PROVIDED WITH A CATHODE-RAY TUBE

Figure 1:
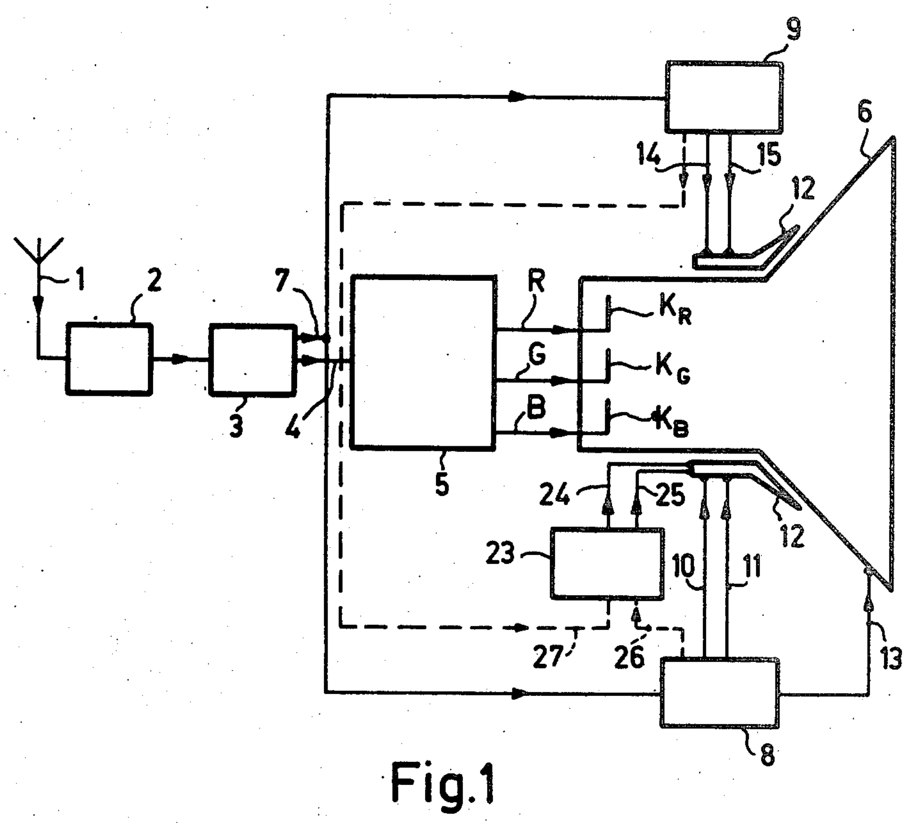

The invention relates to colour television display apparatus provided with a cathode-ray tube having a display screen and a system of deflection coils comprising a magnetic core on which a first and a second deflection coil unit are provided, each unit comprising two preferably symmetrical coil halves said system of deflection coils being slid on the neck of the cathode-ray tube for deflecting at least one electron beam generated in the cathode-ray tube in two substantially orthogonal directions because a deflection current originating from a deflection current generator flows through each coil half, the apparatus furthermore being provided with at least one correction current generator for supplying a correction current in at least one deflection coil unit for generating a quadripolar field approximately at the area of the deflection plane of the electron beam.

Such apparatus is described in U.S. Pat. No. 3,440,483 in which the so-called anisotropic astigmatic deflection errors are corrected. The correction current is dependent on the product of the instantaneous intensities of the two deflection currents. In this known apparatus deflection coils which are wound in any known manner may in principle be used. Toroidally wound coils have the advantage that they can be wound in an easier manner than so-called saddle coils and that they have a lower impedance so that the deflection currents can be supplied through substantially ideal switches (such as transistors or thyristors). However, there is the problem that the correction current generator must supply a large blind power output. The object of the invention is to solve this problem and to this end the display apparatus according to the invention is characterized in that a second quadripolar field is generated approximately at the area of the deflection plane of the electron beam by a second correction current induced in the coil halves of the second deflection coil unit by the correction current flowing in the coil halves of the first deflection coil unit, the voltage produced by the second correction current across each coil half of the second deflection coil unit being substantially zero, and the deflection coil halves being toroidally wound on the core.

The invention is based on the recognition of the fact that the relevant arrangement can also correct so-called isotropic astigmatic errors. U.S. Patent application Ser. No. 52,640, filed July 6, 1970, describes an arrangement in which four auxiliary windings toroidally wound on the core generate a quadripolar field for correcting such deflection errors, the correction current being a function of the square of the instantaneous intensity of one or of the two deflection currents. A similar measure is also possible in the arrangement according to the invention.

It may be noted that it is known per se from German Patent Application 1,514,896 to make one field generated by one deflection coil unit dependent on the field generated by the other deflection coil unit for the purpose of correcting deflection errors. However, the deflection fields themselves and not correction fields are concerned, while the said dependency is brought about by means of separate auxiliary windings on the core.

As is known, these deflection errors may occur when using any television display tube so that the arrangement according to the invention need not be limited to a given type of display tube.

Figure 2:
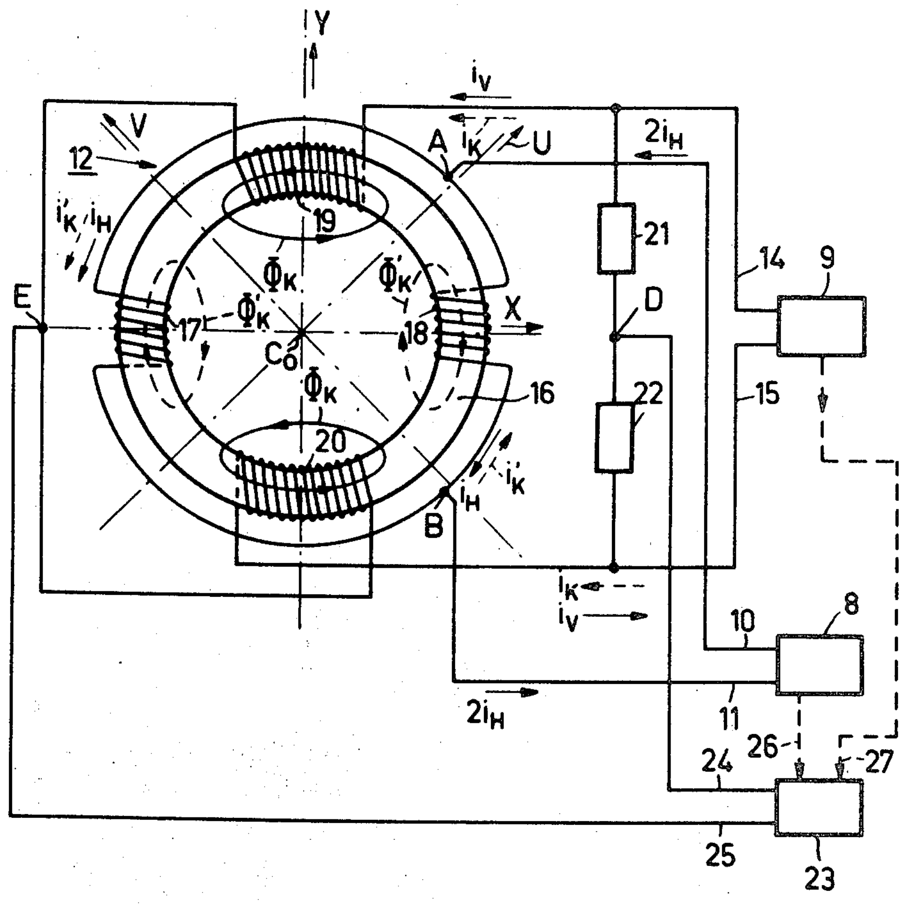
Figures 3A, 3B, 4:
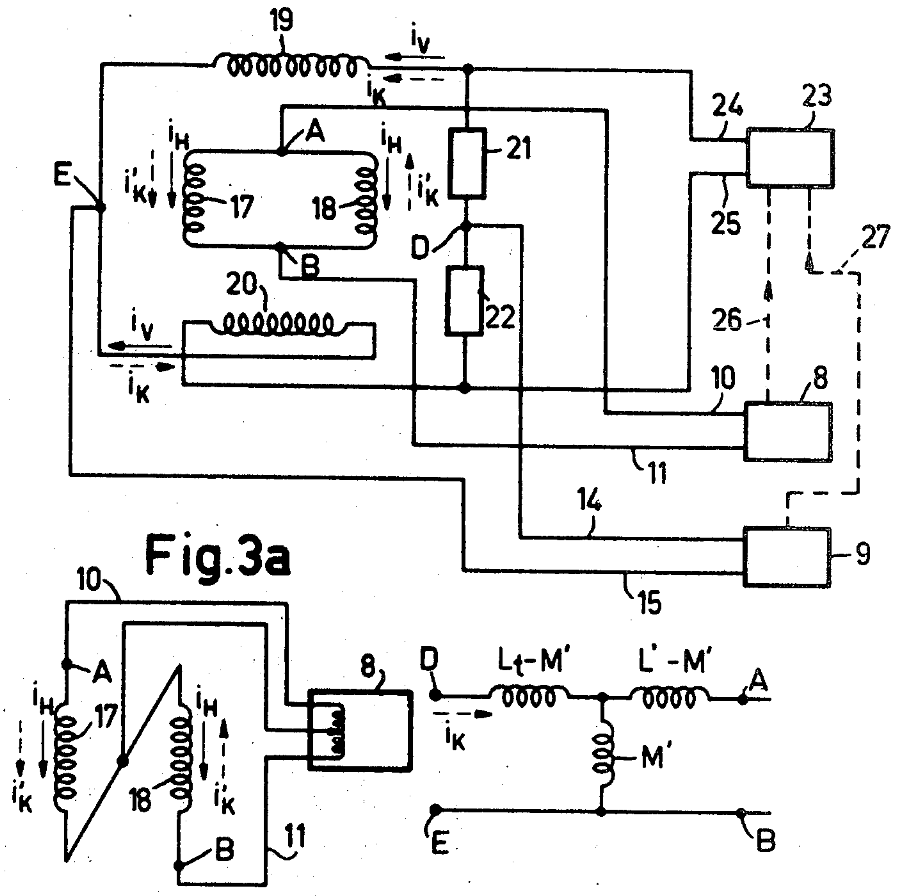
Figure 5A:
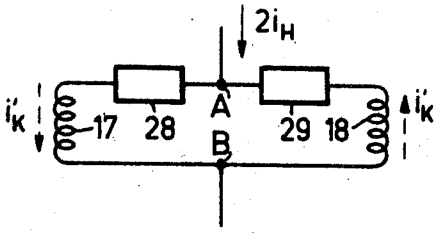
Figure 5B:
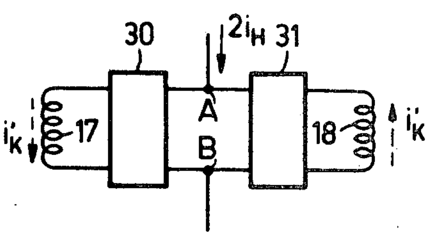
Figure 6:
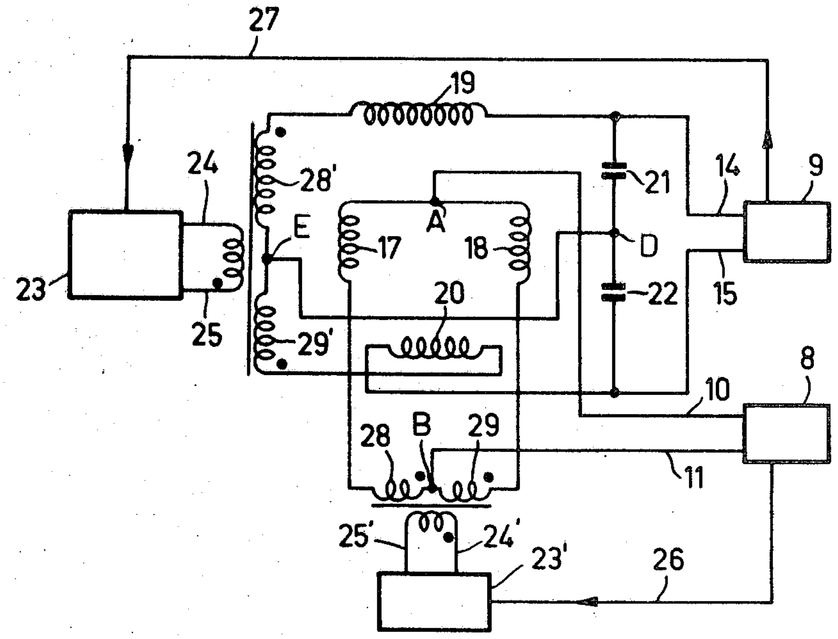
Figure 7:
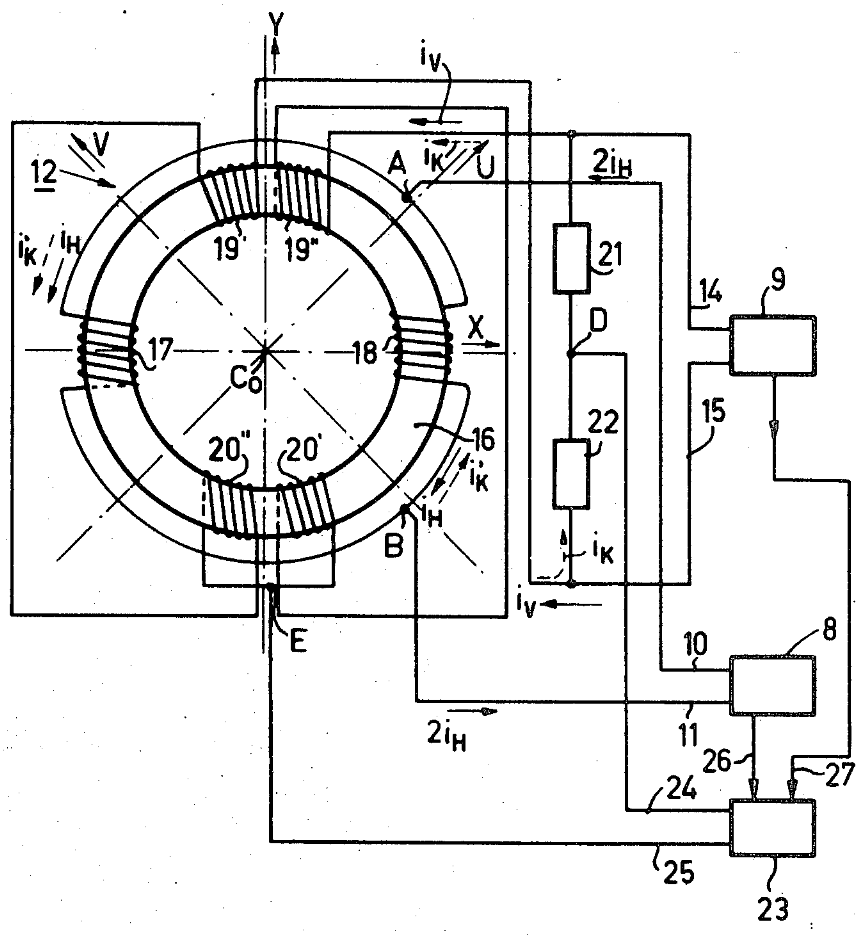

Some possible embodiments of display apparatus according to the invention will be described in detail by way of example with reference to the accompanying Figures in which FIG. 1 shows a display apparatus provided with a three-gun cathode-ray tube, FIG. 2 shows the system of deflection coils as can be used in the arrangement according to FIG. 1 with the switching means according to the invention, FIG. 3*a* and 3*b* show the system of deflection coils as can be used in an arrangement according to FIG. 1 with different arrangements of the switching means according to the invention, FIG. 4 shows the equivalent circuit diagram of part of the arrangement of FIG. 2 or 3, FIGS. 5*a* and 5*b* show detail of a further embodiment of the steps according to the invention, and FIG. 6 and FIG. 7 show the system of deflection coils as can be used in an arrangement according to FIG. 1 with further arrangements of the switching means according to the invention.

In FIG. 1, 1 denotes an aerial by which the colour television signal can be received. This colour television signal is applied to an RF and IF amplifier 2 which amplifies and detects the signal and subsequently applies it to a video amplifier 3. This video amplifier 3 applies the actual video signal consisting of a luminance signal and colour difference signals to a first output 4. These signals are processed in a matrix circuit 5 so that the three colour signals R, G and B become available at the output of this matrix circuit, which signals are applied to the three cathodes $K_R$, $K_G$ and $K_B$ of the cathode-ray tube 6 operating as a colour television display tube. This tube 6 may be of the shadow-mask type and the colour image is displayed on its screen. The synchronizing signal which is applied at one end to the line deflection generator 8 and at the other end to the field deflection generator 9 is derived from a second output 7 of video amplifier 3. Two output terminals 10 and 11 of generator 8 are connected to the system 12 of deflection coils and an output terminal 13 is connected to the acceleration anode of display tube 6 for the supply of the acceleration anode voltage of approximately 25 kV. The output terminals 14 and 15 of field deflection generator 9 are likewise connected to the system 12 of deflection coils for supplying the field deflection current. As a rule, the line deflection current derived from output terminals 10 and 11, together with a deflection unit of deflection coil system 12 ensures the deflection of the electron beams in the horizontal direction, generated by the three cathodes $K_R$, $K_G$ and $K_B$. Simultaneously the field deflection current derived from output terminals 14 and 15, in cooperation with a further deflection unit of deflection coil system 12, ensures the deflection of the three electron beams in the vertical direction.

FIG. 2 shows the system 12 of deflection coils in greater detail. The coil halves 17 and 18 of the first-mentioned deflection unit, i.e. for the horizontal deflection, are provided on a core 16. A line deflection current $i_H$ originating from line deflecting generator 8 flows through windings 17 and 18 which are in this example connected in parallel between two points A and B. The coil halves 19 and 20 of the deflection unit for the vertical deflection are likewise provided on core 16. A field deflection current $i_V$ originating from a field deflection generator 9 flows through windings 19 and 20 which are connected in series in this example. Furthermore FIG. 2 shows the X-axis which coincides with the horizontal deflection direction of the three electron beams in display tube 6. The Y-axis which coincides with the vertical deflection direction is also shown. The centre $C_O$ is the centre of deflection coil system 12 and coincides with the axis of display tube 6 which axis is at right angles to the plane of the drawing of FIG. 2.

The output terminals 14 and 15 of field deflection generator 9 are mutually connected through the series arrangement of two blocking impedances 21 and 22. A correction current generator 23 has two output terminals 24 and 25. Output terminal 24 is connected to the junction D of impedances 21 and 22 and output terminal 25 is connected to the junction E of windings 19 and 20. As a result a correction current $i_K$ generated by generator 23 flows through windings 19 and 20, current $i_K$ being in one winding added to the field deflection current $i_V$ while it is subtracted therefrom in the other winding. Under these circumstances windings 19 and 20 not only generate the magnetic field for the vertical deflection, but also a quadripolar field whose polar axes coincide, in a first approximation, with the diagonals U and V of axes X and Y. The object of the impedance 21 and 22 is to decouple the generators 9 and 23 relative to each other.

Windings 17, 18, 19 and 20 are toroidally wound on the core 16 of deflection coil system 12. Since toroid deflection coils are wound about the core and not against it, such as saddle coils, a comparatively large coupling is produced therebetween through core 16. As a result quite a considerable current $i'_K$ is induced in windings 17 and 18, which current has the same frequency and approximately the same shape as current $i_K$. Under these circumstances windings 17 and 18 not only generate the magnetic field for the horizontal deflection, but also a second quadripolar field whose polar axes coincide, in a first approximation, with those of the above-mentioned quadripolar field.

FIG. 2 shows in a simplified manner the magnetic fluxes $\phi_K$ and $\phi'_K$ which are generated by currents $i_K$ and $i'_K$, respectively. The Figure shows that fluxes $\phi_K$ and $\phi'_K$ counteract each other in core 16, whereas they support each other in the space within core 16. This has the advantage that little flux generated by the correction currents circulates in the core, which would be a pure loss because correction current generator 23 would have to supply a large power for a given effect, and it has the advantage that the two quadripolar fields support each other where this is useful. For this purpose windings 17 and 18 are to be arranged in such a manner and must have a winding sense such that the voltages thereacross eliminate each other so that the voltage present between points A and B is zero. Otherwise not only the described effect, but other wanted or unwanted effects would be obtained which will not be further referred to. Generators 8, 9 and 23 can hardly influence one another. Since the said windings are deflection coil halves they have automatically the correct winding sense as is shown in FIG. 2.

The same result is also obtained with the arrangement shown in FIG. 3*a* which is shown in simpler details than that in FIG. 2. In this Figure correction current generator 23 and field deflection generator 9 have exchanged positions. In the embodiment according to FIG. 2 windings 19 and 20 for field deflection current $i_V$ are arranged in series and in the embodiment according to FIG. 3*a* they are arranged in parallel therefor, while the opposite situations apply for correction current $i_K$.

When the correction current generated by generator 23 is approximately proportional to the square of the instantaneous intensity of line deflection current $i_H$ the arrangement according to FIG. 2 or 3*a* is suitable to correct deflection errors which have been caused by the deflection coil system 12 upon deflection in the X-direction when these errors are of the isotropic astigmatic type. This is further described in said U.S. Patent application Ser. No. 52,640. For this purpose generator 23 must receive information originating from line deflection generator 8 which is shown by the broken line 26 in FIGS. 1, 2, and 3*a*. In a corresponding manner isotropic astigmatic deflection errors upon deflection in the Y-direction can be corrected if the correction current generated by generator 23 is approximately proportional to the square of the instantaneous intensity of field deflection current $i_V$. For this purpose generator 23 must receive information originating from field deflection generator 9 which is shown by the broken line 27 in FIGS. 1, 2 and 3*a*. Likewise as in the above-quoted patent application a combination of the two corrections is also possible. Generator 23 may be formed in known manner, for example as described in said patent application.

FIG. 3*b* shows part of an arrangement according to the invention in which windings 17 and 18 are connected in series for the line deflection current and are connected in parallel for the correction current. The junction of windings 17 and 18 is connected to the central tap of an output winding associated with generator 8. It is evident that the principle of the invention is not effected when the line and/or field deflection coil halves for a given current are arranged in series and for a different current are arranged in parallel, provided that the voltage caused by the induced current across the deflection coil half is zero. If, for one reason or other this voltage is not zero, it can as yet be rendered substantially zero, for example, by connecting in parallel therewith an impedance which is low for the relevant frequency.

In the embodiments described the correction current flows through the field deflection coil halves so that a second correction current is induced in the line deflection coil halves. It is evident that alternatively the line deflection coil halves may be chosen for the correction current while the second correction current is then induced in the field deflection coil halves. Different embodiments are also possible in such a case. A further possibility is the following. Each coil unit 17, 18 and 19, 20 receives its own deflection current $i_H$ and $i_V$, respectively, and additionally a correction current. Thus an induced correction current flows through each coil unit and the quadripolar field generated has four components instead of two. In all cases the windings through which an induced current flows are to be arranged either in series or in parallel in such a manner that the voltage produced thereacross by the induced current is zero.

It may be noted that in a given configuration of deflection coil system 12 the U and V polar axes of the correction quadripolar field are not necessarily the diagonals of the X and Y-axes, but constitute an angle different from 45° therewith. Windings 17, 18, 19 and 20 must be designed in such a manner that the said polar axes are directed such that the isotropic astigmatic deflection errors are actually corrected. In view of the symmetry of the configuration it will be evident that the U and V directions will always be symmetrical relative to the X axis and relative to the Y-axis. An extra degree of freedom may of course be obtained if the windings through which the correction current flows and/or the windings through which the induced current flows are not deflection coil halves but additional windings wound on core 16. This is, however, not necessary for the invention because separate windings can be connected directly to the correction generator. The position of the U and V directions may also be influenced by using a non-homogeneous core, that is to say, a core which consists of parts having different permeabilities or whose cross-section is not constant.

One reason why in case of toroidally wound deflection coils the correction current generator should have supplied a large power in the absence of the step according to the invention has already previously been mentioned, namely the fact that the flux generated by the correction current would circulate in the core and therefore would exert little influence on the electron beams. A second reason is the following. FIG. 2 shows that the fluxes $\phi_K$ in core 16 support each other so that the mutual inductance $M = kL$ between windings 19 and 20 must be considered to be positive, in which $k$ is the coupling factor, while $L$ is the inductance of windings 19 and 20 assumed to be identical. When windings 19 and 20 are arranged in parallel, for correction current $i_K$ the following relation applies for its total inductance:

$$L_t = (L^2 - M^2)/2(L-M) = L^2 (1-k^2)/2L(1-k) = L/2(1+k)$$

if they are arranged in series, there applies:

$$L_t = 2(L+M) = 2L(1+k)$$

On the other hand, the deflection fluxes generated by windings 19 and 20 support each other in the space within core 16 and therefore face each other in the core itself so that inductance $M$ is to be considered negative. The total inductance of these windings for deflection current $i_V$ is, in case of parallel arrangement:

$$L'_t = (L^2-M^2)/2(L+M) = L^2(1-k^2)/2L(1+k) = L/2(1-k)$$

and in case of series arrangement:

$$L'_t = 2(L-M) = 2L(1-k)$$

Since the coupling factor is large (i.e. $k \approx 1$) in toroidally wound cores, it is found that the value $L_t$ in all cases is much higher than the value $L'_t$. Since a correction current generator for practical use will behave as a voltage source rather than as a current source, it must be able to supply a large power for a correct intensity of the correction current. However, due to the stop according to the invention the impedance for the correction current is decreased. FIG. 4 shows the T equivalent circuit diagram of the windings provided on core 16. In this diagram $L_t$ represents the total inductance of windings 19 and 20, $L'$ represents the inductance of windings 17 and 18 based on the same number of turns as that of windings 19 and 20 and taking their mutual inductance into account and $M' = k' \sqrt{L_t L'}$ represents the mutual inductance between the two deflection units, while points A and B are the same points A and B as those in FIGS. 2, 3a and 3b and points D and E are the same points D and E as those in FIGS. 2 and 3a.

Since the coupling factor $k'$ is large, $M'$ is very large so that correction current $i_K$ would indeed be low. However, since the voltage between points A and B is zero, these points of FIG. 4 may be considered to be connected. As a result inductance $M'$ is, as it were, short-circuited by the much lower inductance $L'-M'$ and current $i_K$ may have the required intensity without the power supplied by generator 23 being very large while the intensity of current $i'_K$ is almost equal to that of current $i_K$, which is also an advantage.

FIG. 5 shows a modification of part of the arrangement according to the invention. It may be desired to shift the induced correction current $i'_K$ in phase relative to correction current $i_K$, for example, to give the correction quadripolar field a spatial configuration which in amplitude and shape is in synchronism with one or two deflections. As a result the geometrical properties of the image displayed on the screen of display tube 6 can be further corrected. This may be realized with the aid of the deflection coil halves in cooperation with two substantially identical impedances 28 and 29 which may be coupled together and which are arranged in series with the deflection coil halves (FIG. 5a) or in parallel therewith, or with two substantially identical networks 30 and 31 having two inputs and two outputs (FIG. 5b). In FIG. 5 the induced correction current $i'_K$ flows through windings 17 and 18. Also in this case the voltage between points A and B is zero. Impedances or networks having two inputs and two outputs may alternatively be arranged in the path through which the correction current $i_K$ flows.

FIG. 6 shows an embodiment in which a combination of the mentioned possibilities is used. Windings 17 and 18 for the horizontal deflection are arranged in parallel for the line deflection current, whereas they are arranged in series through two coils 28 and 29 coupled together for a correction current originating from a generator 23'. Windings 19 and 20 for the vertical deflection are arranged in series for the field deflection current, whereas they are arranged in parallel through two coils 28' and 29' coupled together for a correction current originating from a generator 23. If desired, generators 23 and/or 23' may comprise phase-shifting networks. Blocking impedances 21 and 22 are two capacitors with which the reactance is high for the field frequency and low for the line frequency so that they ensure a decoupling between generators 8 and 23 at one end and generator 9 at the other end, while the voltage produced by the induced correction current across windings 19 and 20 is substantially zero. The inductance of coils 28' and 29' is in fact negligible relative to that of windings 19 and 20. In this embodiment the correction current generated by generator 23 is approximately proportional to the square of the instantaneous intensity of the field deflection current whie the correction current generated by generator 23' is approximately proportional to the square of the instantaneous intensity of the line deflection current.

The principle of the invention cannot be used without further difficulty for the correction of anisotropic astigmatism. In fact, the polar axes of the correction quadripolar field must in this case coincide with the X and Y axes, which is not possible in the construction according to FIG. 2. A suitable quadripolar field is produced when a deflection coil unit, for example, that for the field deflection is split up as is shown in FIG. 7. In this unit windings 19 and 20 are each split up in two substantially equal coil parts 19', 19'' and 20', 20'', respectively, in which parts 19'' and 20' at one end and parts 19' and 20'' at the other end constitute the coil halves. Of course it is to be ensured that the current directions are correct. In FIG. 7, likewise as in FIG. 2, the field deflection coils are arranged in series for field deflection current $i_V$ and in parallel for correction current $i_K$, while output terminal 25 of correction current generator 23 is connected to the common point E of parts 20' and 20''. Generator 23 then provides a correction current $i_K$ which is approximately proportional to the product of the instantaneous intensity of the two deflection currents. It is evident that different embodiments such as are used for the correction of isotropic astigmatism are alternatively possible in this case.

What is claimed is:

1. Colour television display apparatus provided with a cathode-ray tube having a display screen and a system of deflection coils comprising a magnetic core on which a first and a second deflection coil unit are provided, each unit comprising two preferably symmetrical coil halves, said deflection coil system being slid on the neck of the cathode-ray tube for deflecting at least one electron beam generated in the cathode-ray tube in two substantially orthogonal directions because a deflection current originating from a deflection current generator flows through each coil half, the apparatus furthermore being provided with at least one correction current generator for supplying a correction current in at least one deflection coil unit for generating a quadripolar field approximately at the area of the deflection plane of the electron beam, characterized in that a second quadripolar field is generated approximately at the area of the deflection plane of the electron beam by a second correction current induced in the coil halves of the second deflection coil unit by the correction current flowing in the coil halves of the first deflection coil unit, the voltage produced by the second correction current across each coil half of the second deflection coil unit being substantially zero, and the deflection coil halves being toroidally wound on the core.

2. Apparatus as claimed in claim 1, characterized in that the polar axes of the second quadripolar field substantially coincide with the polar axes of the first quadripolar field.

3. Apparatus as claimed in claim 1, characterized in that the first correction current and the first deflection current flow in the same directions through one coil half of the first deflection coil unit and in opposite directions through the other coil half thereof, and that the second correction current and the second deflection current flow in the same directions through one coil half of the second deflection coil unit and in the opposite directions through the other coil half thereof.

4. Apparatus as claimed in claim 1, characterized in that the coil halves of the second deflection coil unit are arranged in parallel for the second deflection current.

5. Apparatus as claimed in claim 1, characterized in that the coil halves of the second deflection coil unit are arranged in series for the second deflection current and that each coil half is shunted by an impedance of low value for the frequency of the first correction current.

6. Apparatus as claimed in claim 1, characterized in that the second correction current is shifted in phase relative to the first correction current.

7. Apparatus as claimed in claim 1, characterized in that the magnetic resistance of the core is place-dependent.

8. An apparatus for a cathode-ray tube having a display screen and a system of deflection coils comprising a magnetic core on which a first and a second deflection coil unit are provided, each unit comprising two preferably symmetrical toroidal coil halves, said deflection coil system being on the neck of the cathode-ray tube for deflecting at a deflection plane at least one electron beam generated in the cathode-ray tube in two substantially orthogonal directions; said apparatus comprising a deflection current generator means for supplying to each coil half a deflection current, at least one correction current generator means for supplying a first correction current to said first deflection coil unit and for generating a first quadripolar field approximately at the area of said deflection plane of the electron beam, and means for generating a second quadripolar field approximately at the area of the deflection plane of the electron beam by a second correction current induced in the coil halves of the second deflection coil unit by said first correction current flowing in the coil halves of the first deflection coil unit and for providing that the voltage produced by the second correction current across each coil half of the second deflection coil unit is substantially zero.

* * * * *

PO-1050
(5/69)

UNITED STATES PATENT OFFICE
CERTIFICATE OF CORRECTION

Patent No. 3,793,554 Dated February 19, 1974

Inventor(s) EDGARD EMILE CHARLES ROSSAERT

It is certified that error appears in the above-identified patent and that said Letters Patent are hereby corrected as shown below:

<u>IN THE TITLE PAGE</u>

Below "Foreign Application Priority Data" cancel "7013889" and insert -- 7113889 --;

Signed and sealed this 9th day of July 1974.

(SEAL)
Attest:

McCOY M.GIBSON,JR.
Attesting Officer

C. MARSHALL DANN
Commissioner of Patents